US011322265B2

(12) United States Patent
Cohen et al.

(10) Patent No.: US 11,322,265 B2
(45) Date of Patent: May 3, 2022

(54) SYSTEM AND METHOD FOR SMALL, CLEAN, STEADY-STATE FUSION REACTORS

(71) Applicant: THE TRUSTEES OF PRINCETON UNIVERSITY, Princeton, NJ (US)

(72) Inventors: Samuel A. Cohen, Princeton, NJ (US); Matthew K. Chu Cheong, Austin, TX (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/167,187

(22) Filed: Feb. 4, 2021

(65) Prior Publication Data

US 2021/0158977 A1 May 27, 2021

Related U.S. Application Data

(62) Division of application No. 17/011,400, filed on Sep. 3, 2020, now Pat. No. 10,923,236, which is a division
(Continued)

(51) Int. Cl.
G21B 1/05 (2006.01)
F03H 1/00 (2006.01)

(52) U.S. Cl.
CPC ........... *G21B 1/052* (2013.01); *F03H 1/0081* (2013.01); *F03H 1/0093* (2013.01); *Y02E 30/10* (2013.01)

(58) Field of Classification Search
CPC ..................................................... G21B 1/052
See application file for complete search history.

(56) References Cited

U.S. PATENT DOCUMENTS 4,774,065 A * 9/1988 Penzhorn ............... G21B 1/115
423/210
4,817,832 A * 4/1989 Nagy ................... B65D 47/063
222/529

(Continued)

FOREIGN PATENT DOCUMENTS

WO 2013191779 A2 12/2013
WO 2014031190 A2 2/2014

OTHER PUBLICATIONS

International Search Report and Written Opinion for PCT/US2016/019238, dated Jul. 26, 2016.
(Continued)

*Primary Examiner* — Lily C Garner
(74) *Attorney, Agent, or Firm* — Meagher Emanuel Laks Goldberg & Liao, LLP.

(57) ABSTRACT

According to some embodiments, a system for widening and densifying a scrape-off layer (SOL) in a field reversed configuration (FRC) fusion reactor is disclosed. The system includes a gas box at one end of the reactor including a gas inlet system and walls of suitable heat bearing materials. The system further includes an exit orifice adjoining the gas box, wherein the exit orifice has a controllable radius and length to allow plasma to flow out from the gas box to populate the SOL with the plasma. The system may also include fusion products, which decrease in speed in the plasma in the SOL, allowing energy to be extracted and converted into thrust or electrical power and further allowing ash to be extracted to reduce neutron emissions and maintain high, steady-state fusion power.

11 Claims, 12 Drawing Sheets

Related U.S. Application Data of application No. 15/552,665, filed as application No. PCT/US2016/019238 on Feb. 24, 2016, now abandoned.

(60) Provisional application No. 62/120,211, filed on Feb. 24, 2015, provisional application No. 62/120,206, filed on Feb. 24, 2015, provisional application No. 62/120,195, filed on Feb. 24, 2015.

(56) References Cited

U.S. PATENT DOCUMENTS

| | | | | |
|---|---|---|---|---|
| 4,875,945 | A * | 10/1989 | Penzhorn | G21F 9/02 376/146 |
| H936 | H * | 7/1991 | Ho | 376/124 |
| 5,154,878 | A * | 10/1992 | Busigin | G21B 1/115 376/310 |
| 6,334,302 | B1 | 1/2002 | Chiang-Diaz | |
| 6,639,962 | B2 * | 10/2003 | Enomoto | C21D 7/06 376/305 |
| 9,308,406 | B2 * | 4/2016 | Dunster | A62C 13/76 |
| 2010/0002823 | A1 | 1/2010 | Monkhorst et al. | |
| 2011/0170648 | A1 * | 7/2011 | Kotschenreuther | G21B 1/01 376/133 |
| 2014/0126679 | A1 * | 5/2014 | Egely | G21B 3/002 376/156 |

OTHER PUBLICATIONS

Twarog, "Field-Reversed Configuration Inducted by a Paramagnetic Field." IEEE Transactions on Plasma Science, vol. 41, No. 2, Feb. 2013.
Paluszek et al., "Direct Fusion Drive for a Human Mars Orbital Mission." Princeton Plasma Physics Laboratory, PPPL 5064, Aug. 2014.
Kesner et al. "Helium catalysed D-D fusion in a levitated dipole" Nucl. Fusion 44 (2004) 193-203.
Khvesyuk et al. "Low-radioactivity D-3He fusion fuel cycles with 3He production" Plasma Phys. Control. Fusion 44 (2002) 253-260.
Sawan et al. "Impact of tritium removal and He-3 recycling on structure damage parameters in a D-D fusion system" Fusion Engineering and Design 61-62 (2002) 561-567.
Paluszek, Michael, et al. "Direct Fusion Drive For Advanced Space Missions", Princeton Satellite Systems, PPPL.
Razin, Yosef S., et al. "A direct fusion drive for rocket propulsion", Acta Astronautica vol. 105, pp. 145-155 (2014).
Steinhauer, Loren C. "Review of field-reversed configurations", Physics of Plasmas, 18, 070501 (2011).

* cited by examiner

SYSTEM AND METHOD FOR SMALL, CLEAN, STEADY-STATE FUSION REACTORS

CROSS-REFERENCE TO RELATED APPLICATIONS

This application is a Divisional of U.S. application Ser. No. 17/011,400 filed on Sep. 3, 2020 which is a Divisional of Ser. No. 15/522,665 filed on Aug. 22, 2017 which a US national stage of PCT/2016/019238 filed on Feb. 24, 2016, which claims priority to provisional applications 62/120,195, 62/120,206, and 62/120,211, all filed on Feb. 24, 2015, which are herein incorporated by reference in their entireties.

GOVERNMENT RIGHTS IN THIS INVENTION

This invention was made with government support under Grants No. DE-AC02-09CH11466 awarded by the Department of Energy. The government has certain rights in the invention.

FIELD OF THE INVENTION

Embodiments of the present invention relate generally to plasma physics and, more particularly, to fusion reactors.

BACKGROUND OF THE INVENTION

Small, safe, and clean power plants located in cities could provide power locally without transmission losses and with less susceptibility to rolling blackouts, extremes of nature, catastrophes, or acts of aggression. Alternatives, such as local solar and wind power, cannot provide the areal density needed for cities. The local power plants would utilize nuclear fusion in hot plasmas. For decades, international government consortia have been collaborating to develop multi-GWe power plants based on tokamak devices burning deuterium tritium (D-T) fuel. However, recent theoretical and experimental advances point to the field-reversed configuration (FRC) plasma device as a promising way to make smaller reactors with far less radioactivity.

FRC plasma devices possess very attractive technical features, such as high plasma pressure, simple geometry, and natural exhaust channels (divertors), which favor their development into practical and clean fusion power plants. However, experiments on current FRCs have only produced plasma pressures, energy confinement times, and pulse lengths orders-of-magnitude smaller than needed in power-producing reactors.

Several research paths towards FRC reactors have been described within the US fusion community. These paths strongly differ in technical and scientific methods, required funding levels, and describe reactors of widely varying output, from 100 kW to 5 GW.

The first approach involves using p-$^{11}$B as fuel in a steady-state FRC reactor heated by neutral beams. The major benefit is that this fuel creates the lowest power in neutron emissions of all fusion reactions. However, this approach has several drawbacks. The power produced by each p-$^{11}$B fusion event is half that by the other (D-T or D-$^3$He) fuel mixtures. Compounding this problem is the higher plasma temperature required for p-$^{11}$B fusion; hence, a higher magnetic field is needed. Additionally p-$^{11}$B only allows a lower density of fuel compared to D-T or D-$^3$He at fixed electron density because of the high charge on the $^{11}$B nucleus. Achieving net power production with p-$^{11}$B is highly questionable. Moreover, this reactor would be large, producing over 500 MW of power, which is above the value considered suitable for a distributed power grid, typically 1-100 MW per reactor.

The second FRC approach proposed large (multi-GWe) D-T burning, beam-heated FRCs. However, the drawbacks are similar to tokamaks including high radiation (neutron) levels, which lead to major safety and siting issues; high maintenance because of neutron damage and activation; complex tritium breeding required; and large costly power plants.

The third approach is pulsed, compressed, low-duty-factor FRCs in which the fusion takes place in pulses less than 1 ms in duration at rates up to 100's of pulses per second. Accordingly, the pulses of power are explosive in nature, placing great stresses on the mechanical structure. Several methods have been proposed for producing the compression and accompanying heating. A hydraulic compression of D-T FRC plasmas within a 1-m-thick, nearly spherical, rotating, molten Li bath has been described. However, that amount of Li is dangerous and it has not been determined how to achieve 10's of pulses per second. Furthermore, D-T has the usual problems of high radioactivity and material damage. Several other methods of compressive heating have also been described including fast merging of counter propagating FRCs; compression of a fast moving FRC as it travels through a tapered conducting tube; and imploding liners. While previous work focused on D-T burning, D-$^3$He burning is also being considered to reduce neutron production. However, there is no description for how to remove the T fusion product from the burning plasma when burning D-$^3$He for keeping the reactor truly clean, nor is there a method to gain a sufficient supply of $^3$He needed for significant power production.

Conventional (tokamak) fusion reactor designs include robust divertor plates whose function is to intercept warm plasma leaving the core, to prevent damage to more susceptible inner wall components. In a standard divertor scheme, the exterior region of a confined plasma, referred to as a scrape-off layer (SOL), impinges on the divertor's collector plate, depositing some of the plasma's energy in the process. For example, in a system such as the International Thermonuclear Experimental Reactor (ITER), these power loads may transiently rise from steady-state values near 10 MW/m$^2$ to above 100 MW/m$^2$. Ion fluxes would exceed $10^{24}$/m$^2$ s. Such high heat and particle fluxes to the collector plate lead to melting, erosion, sputtering, and cyclic heat load problems, not only damaging the divertor structure, but also leading to the undesirable introduction of highly detrimental impurities, such as tungsten, into the plasma.

Furthermore, in conventional D-T reactor designs, fusion ash, i.e., alpha particles generated in the core plasma by fusion, diffuses across the reactor into the SOL where it may be exhausted into divertor channels. This diffusive transport is slow, on the order of many seconds, which leads to the ash displacing fusion fuel in the core. This reduces fusion power output. Even worse for D-$^3$He reactors, if the T fusion ash were to remain in the plasma for seconds, neutron production would grow, causing the fusion reactors to be more dangerous. Methods to accelerate the exhaust of fusion ash have been proposed, including alpha channeling, but this is a complicated, untested process that requires additional sophisticated high power RF equipment. Moreover, alpha channeling is a wave method that may not work in a relatively small plasma, particularly one with strong gradients in its magnetic field and plasma parameters, as are in FRCs.

Thus, there is a need for a fusion reactor configuration that addresses these and other shortcomings of the current system.

SUMMARY OF THE INVENTION

According to some embodiments, a system for widening and densifying a scrape-off layer (SOL) in a field reversed configuration (FRC) fusion reactor is disclosed. The system includes a gas box at one end of the reactor including a gas inlet system and walls of suitable heat bearing materials. The system further includes an exit orifice adjoining the gas box, wherein the exit orifice has a controllable radius and length to allow plasma to flow out from the gas box to populate the SOL with the plasma. The system may also include fusion products, which decrease in speed in the plasma in the SOL, allowing energy to be extracted and converted into thrust or electrical power and further allowing ash to be extracted to reduce neutron emissions and maintain high, steady-state fusion power.

According to some embodiments, a method for widening and densifying the SOL in a FRC fusion reactor is disclosed. The method includes creating a plasma in a gas box at one end of the reactor, wherein the plasma created in the gas box is cooler than both core plasma in a closed field region of the reactor and SOL plasma near a midplane of the reactor; causing the plasma from the gas box to flow out of the gas box through an exit orifice of controllable radius and length; and populating the SOL with the plasma that has flowed out of the gas box. The method may also include decreasing speed of fusion products in the plasma in the SOL; extracting energy from the fusion products; and converting the energy into thrust or electrical power.

According to some embodiments, a fusion reactor system is disclosed. The system includes a first FRC fusion reactor, which burns D-D fuel to breed $^3$He and T and a second FRC fusion reactor, which burns D-$^3$He fuel. The bred $^3$He is supplied to the first FRC fusion reactor and second FRC fusion reactor, and the bred T is transmuted to $^3$He to be supplied to the second FRC fusion reactor.

According to some embodiments, a method for increasing $^3$He supply for use in FRC fusion reactors is disclosed. The method includes burning D-D fuel in a first FRC reactor, whereby burning D-D fuel breeds $^3$He and T; producing power in the first FRC reactor with the initially bred $^3$He; storing T bred in the first FRC reactor to transmute T to $^3$He; and providing the $^3$He transmuted from T to the second FRC.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Disclosed herein is a FRC plasma device designed to reduce technical and financial risks. An object of the present invention is to make practical, safe, small reactors suitable for a distributed power grid and in population centers. Radioactivity is kept at negligible levels, accomplished in part by the choice of fuel. Embodiments of the present invention produce either hydrogen (H) plasmas, D-$^3$He, or D-D plasmas or combinations of these. Even under the most extreme conditions, H barely fuses, leading to virtually no radioactivity, but no fusion power. The fusion of D-$^3$He can be controlled to produce less than $\frac{1}{1000}^{th}$ the neutron wall load, measured in MW/m$^2$, of a fission reactor or D-T tokamak reactor per unit of power, as described below. However, the main drawback with D-$^3$He is the scarcity of $^3$He. Nonetheless, embodiments of the present invention, which discloses the use of a pair of small FRC reactors, one to provide $^3$He fuel for the second, may apply the system and methods used in D-$^3$He fusion to the more abundant D-D in such a way as to reduce its neutron wall load of one FRC reactor below 5% that of a fission reactor and of the second below 0.1%.

The safety of such small power plants would be high. Nuclear runaway would be passively avoided. No actinides are used or produced. Chemical reactions of all the fuel on site would release no more energy than one pint of gasoline. The magnetic energy in the reactor is comparable to that in MRI systems used in hospitals. By operating several of the proposed reactor modules, applications that require higher power levels, such as spacecraft propulsion, may be accomplished. Embodiments of the present invention may be about $\frac{1}{1000}$ the volume and mass of conventional fusion reactors, namely the tokamak, and would produce proportionally less power (5 MW rather than 5 GW). Being a clean reactor avoids the costly and lengthy development of radiation-resistant materials and eases siting requirements. Small FRC reactors have been described in U.S. Patent Publications 2015/0098543 and 2015/0294742, which are herein incorporated by reference.

Figure 1A:
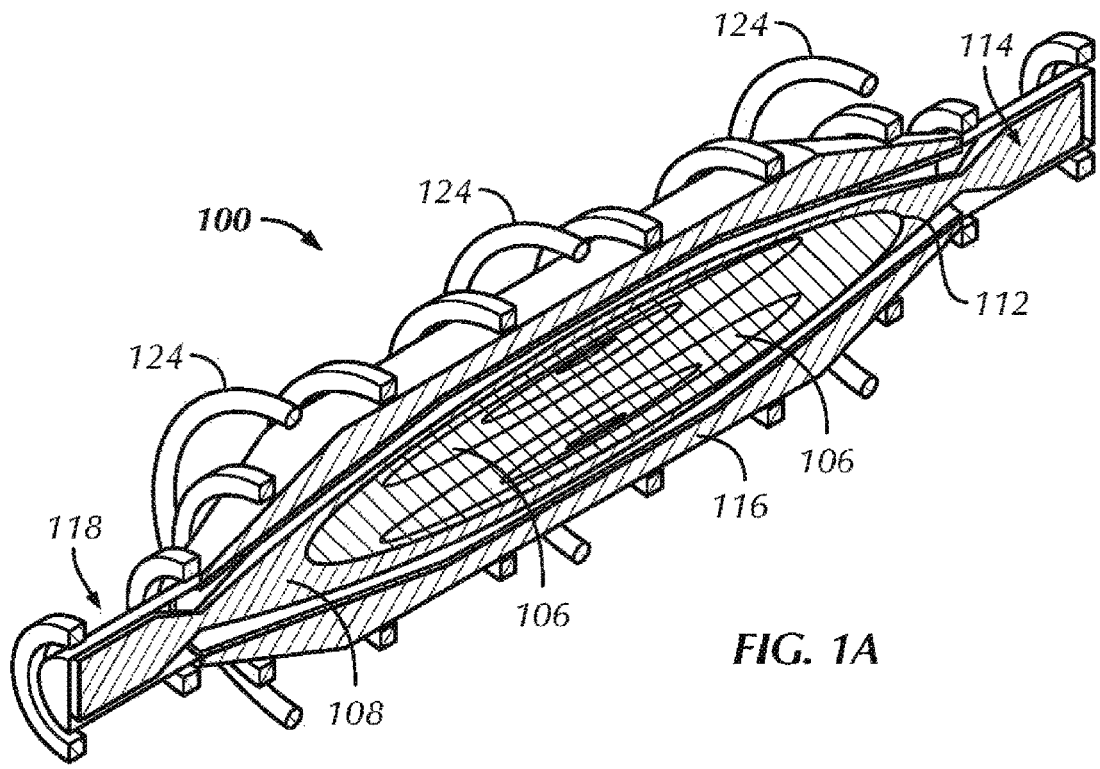
FIGS. 1a and 1b are schematic diagrams of a fusion reactor according to an embodiment of the present invention.
Figure 1B:
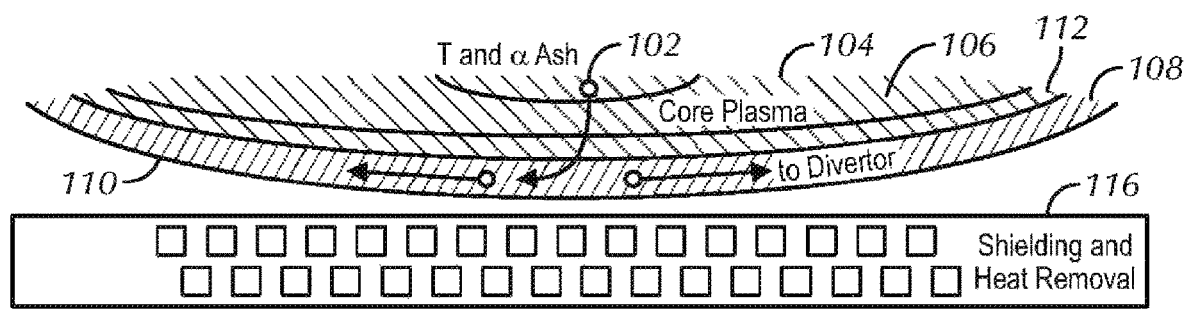

FIG. 1a illustrates a FRC fusion reactor 100 according to an embodiment of the present invention. FIG. 1b emphasizes the ability of the small FRC reactor 100 to rapidly exhaust T and α ash 102 created by D-D and D-$^3$He fusion. The fusion reactor 100 may burn predominantly D-$^3$He or D-D fuel mixtures. A small amount of T ash 102 may appear in core plasma 104 from D-D fusion. If this builds up an increase in neutron shielding thickness would be required. T concentration in the fuel mixture will be minimized, by a method described below, because it would jeopardize the reactor components.

The fusion reactor 100 includes a closed field region 106 that contains the hot fusing core plasma 104, whose ion temperature is in the range 70-150 keV. Core electrons are somewhat cooler, ~20-40 keV. The radial dimension of the closed field region 106 may be about 25 cm. Larger radii are possible, but too large a radius interferes with the radio-frequency heating method of the reactor 100, rapid T exhaust, and plasma stability. Moreover, smaller radii are possible as well, but too small a radius does not allow adequate energy confinement time. Because of these and other constraints, the radius of the core plasma 104 in the reactor 100 will be in the range 15 to 35 cm. The length of the core plasma 104 may be about 5 times the diameter of the FRC reactor 100, though longer FRCs may be made to allow commensurably more power. Surrounding the closed field region 106 is an open field line region 108 that contains a cooler scrape off layer (SOL) 110. The radial thickness of the open-field-line region 108 at the midplane of the FRC reactor 100 may be between 0.5 and 5 cm in order to match the power extraction rate needed in the SOL 110. The approximate range of electron and ion temperatures in the SOL 110 may lie between 10 and 200 eV, as illustrated in the graphs shown in FIG. 6, to be discussed below.

The boundary between the closed and open field-line regions 106 and 108 is a closed surface called the separatrix 112. Fusion products must cross the separatrix 112 to deposit their energy in the SOL 110 and remain fully in the SOL 110 to be exhausted out in an exhaust plume 114. Neutron shielding 116 surrounds the open field region 108, where the thickness of the neutron shielding 116 depends on the fuel mixture used. (D-D requires thicker neutron shielding 116 than D-$^3$He, and D-T requires thicker shielding than D-D.) The neutron shielding 116 material may be $^{10}$BC, chosen for its high electrical resistivity, high-temperature thermo-mechanical properties, and strong neutron-absorption characteristics.

Figure 2A:
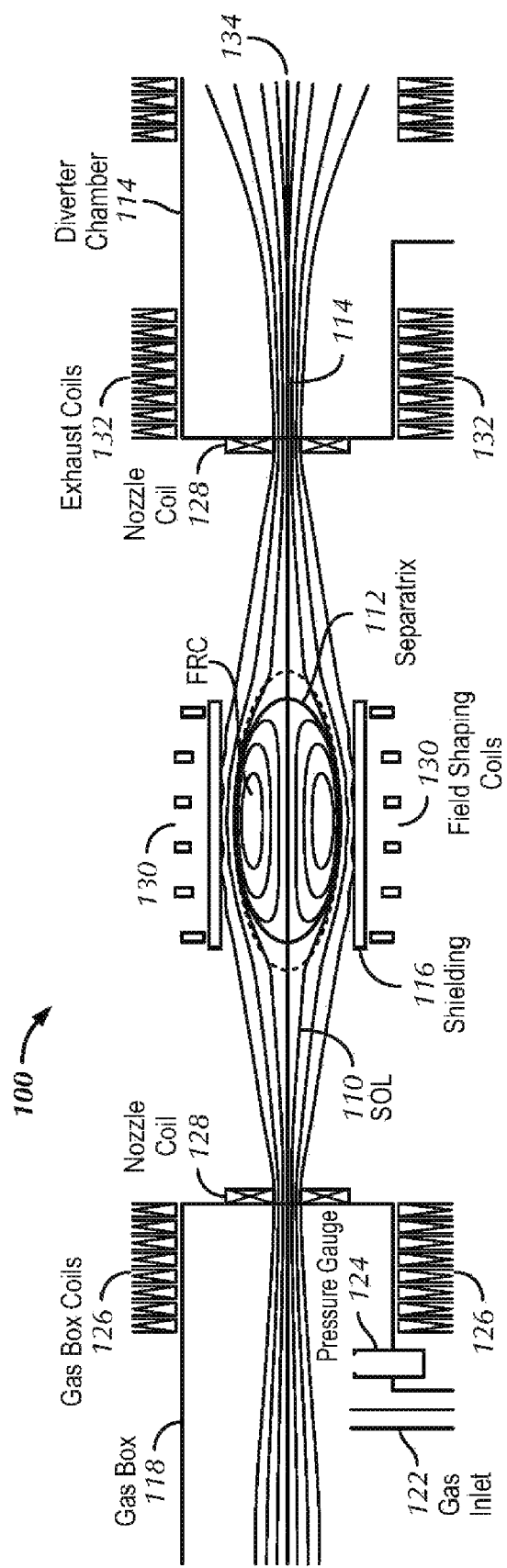
FIGS. 2a and 2b are schematic diagrams of a fusion reactor emphasizing a gas-box divertor at one end and an exhaust divertor at the other, according to an embodiment of the present invention.
Figure 2B:
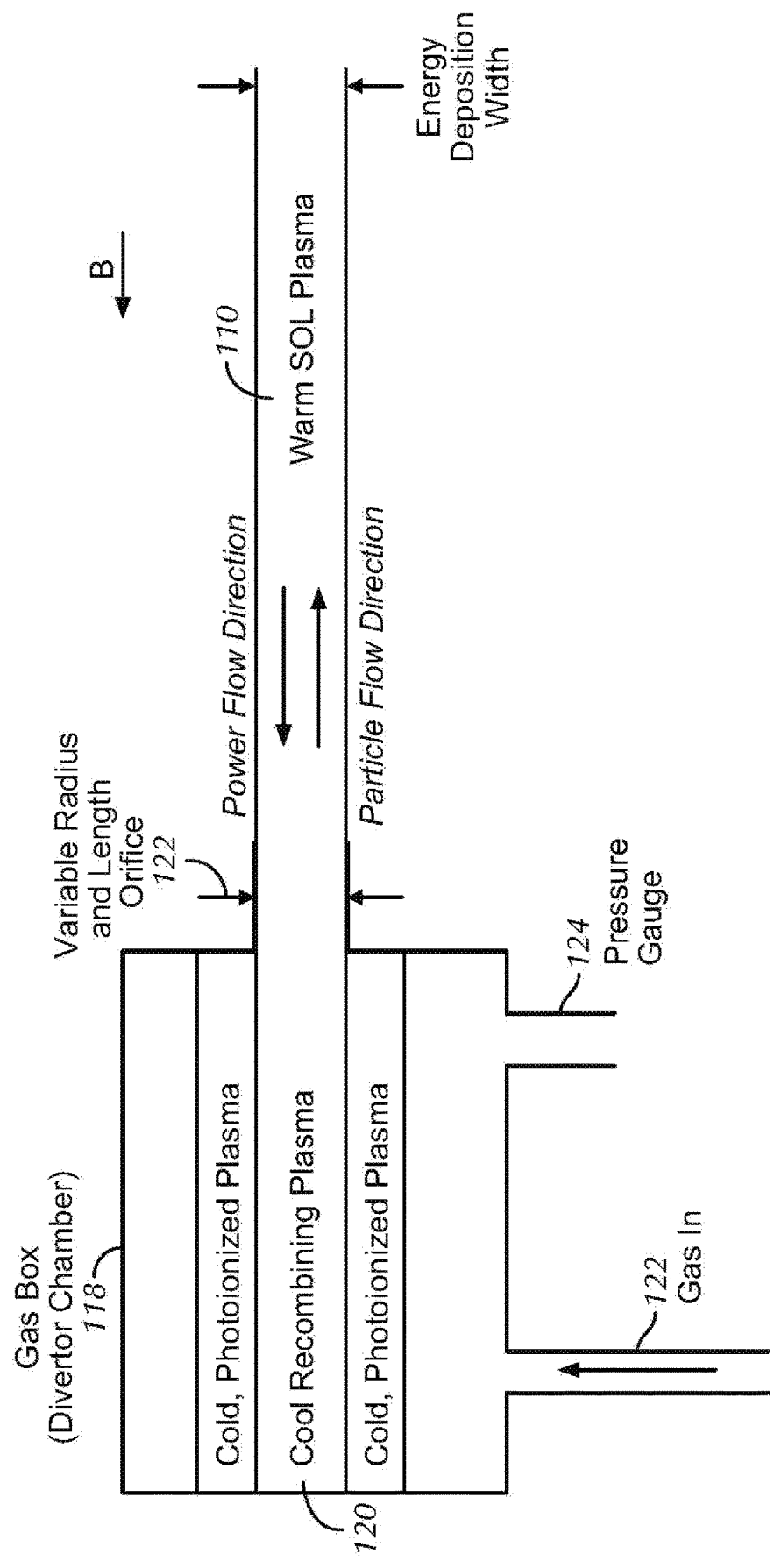

Referring now to FIGS. 2a and 2b, the fusion reactor 100 is shown with emphasis on a gas box divertor 118. The fusion reactor 100 includes at least one gas box divertor 118 into which D or H gas is injected, to form plasma 120 which then absorbs power from the fusion products. This plasma 120 may possibly serve as a propellant for spacecraft propulsion or as the working-fluid for turbine applications. The gas box 118 has a gas inlet system 122 and a pressure gauge 124. The gas box walls may be made of conventional heat-bearing materials, such as refractory metals, e.g., tungsten, copper-clad steel, or vanadium and its alloys. Coatings could be applied, e.g., Pd, to control permeability. This gas influx cools the plasma 120 in the gas box 118 and increases the plasma 120 density in the gas box 118. The cool plasma 120 may have a peak electron temperature in the range of 0.5-50 eV and a peak density in the range of $10^{16}$ cm$^{-3}$ to $3\times10^{13}$ cm$^{-3}$. The cool plasma 120 formed in the gas box 118 flows out of the gas box 118 along the magnetic field in a few-cm-thick layer determined by an exit orifice 122 to the gas box 118. This cool plasma 120 then forms the SOL plasma 110, which flows along the separatrix 112, extracting energy from the fusion products 102 that pass through the SOL 110. The SOL plasma 110 may have a peak temperature in the range of 10-200 eV and a peak density in the range of $5\times10^{14}$ cm$^{-3}$ to $3\times10^{13}$ cm$^{-3}$. The SOL plasma 110, thus warmed, carries that energy out predominantly in the exhaust plume 114. Fusion ash 102 joins in the flow after the ash 102 has cooled to energies below about ¼ MeV. The added gas and fusion ash 102 exit, as plasma, in the exhaust plume 114, providing power and momentum flow. The gas box 118 is sufficiently long, ca. 1 m, for the plasma 120 to enter a detached mode of operation when the gas box 118 pressure is typically in the range 0.03-1 Torr. Operation of the gas box 118 in the detached regime, in addition to lowering peak power loads and energetic particle bombardment of the walls of the gas box 118, allows a lower SOL 110 electron temperature and a higher SOL 110 electron density, both beneficial to the rapid extraction of fusion products 102 and energy from them. However, it may not be necessary to operate the gas box 118 in the detached mode, as an attached mode of operation should provide reasonably adequate parameters for ash 102 exhaust. The gas box 118 would absorb a part of the fusion power, ca 10%, hence its wall should be surrounded by equipment—such as metal plates with cooling tubes to carry a fluid which extracts the heat from the plates—necessary to capture that energy and convert it to electricity. The descriptor "detached," when applied to a plasma, means that the plasma temperature has fallen to such a low value, typically less than 2 eV, and the plasma density is sufficiently high, typically above $5\times10^{13}$ cm$^{-3}$, that the rate of volumetric 3-body plasma recombination to neutrals exceeds the ionization rate.

The exit orifice (or nozzle) 122 adjoining the gas box 118 of the fusion reactor 100 is of adjustable length and radius. The exit orifice 122 controls the width of the SOL plasma 110 and also reduces the flow of unionized gas out of the gas box 118. The adjustable radius, in conjunction with the gas feed rate and plasma creation processes in the gas box 118, predominantly sets the density width of the SOL 110. In one embodiment, the orifice 122 may have a radius of about 7 cm, though the radius may range from 3 to 15 cm in other embodiments. The orifice 122 radius was chosen so that the magnetic flux of the SOL 110 would be the same at the FRC midplane as in the nozzle 122. Hence a higher nozzle 122 magnetic field would necessitate a smaller orifice 122 radius. A higher nozzle 122 field would increase the mirror ratio, a useful way to control the axial loss of fast particles, e.g., ash, 102 from the SOL 110. The energy deposited by fusion products 102 in the SOL then sets the broad radial profile of the field-parallel power flow in the SOL 110.

Referring back to FIG. 1a, the fusion reactor 100 further includes a plurality of odd parity rotating magnetic field (hereafter referred interchangeably as RMF or RMF$_o$) antennae 124 for heating the plasma and driving current in the core plasma 104. The RMF antennae 124 create a time-varying rotating azimuthally directed electric field within the plasma, strongest at the FRC's midplane, which is the location of the FRC's O-point null line. This accelerates ions and electrons into punctuated betatron orbits. The high-energy electrons are very efficient in carrying the required azimuthal current. The high-energy ions also are efficient in carrying the azimuthal current and the high energy is necessary for a high fusion rate. The ion energy and velocity distributions are highly kinetic, which adds to the stability of the FRC reactor 100 and reduces neutron production because the different ions, the $D^+$'s and the $^3He^{++}$'s, have beam-like distributions with different velocities. The RMF antennae 124 may also allow energy extraction directly from the fusion products 102.

Referring again to FIG. 2a, the fusion reactor 100 includes four types of magnet coils, all coaxial to the main axis of the fusion reactor 100. These types of coils are gas box coils 126, mirror (also called nozzle) coils 128, field shaping coils 130, and exhaust coils 132. Any number of coils for each may be used. Each coil may have an extended axial length. The gas box coils 126 surround the gas box 118 and are used to control the field shape within the gas box 118. Typically these field lines will be nearly straight, but could expand slightly to allow easier penetration of gas and better control of operation in the detached mode. The nozzle coils 128 at the entrance to the gas box 118 helps control the plasma diameter in the orifice 122 and also the mirror ratio of the main FRC region 106 and 108. The field shaping coils 130 surround the main FRC region 106 and 108, and control the shape of the FRC, including its elongation which is important to the power generation rate and stability. Segmented field shaping coils 130 will create corrugations in the separatrix 112, in the core plasma 104, and in the SOL plasma 110. Corrugations will help plasma stability against co-interchange modes. The nozzle coils 128 at the exhaust plume 114 will develop the double layer for accelerating ions out, for generating thrust and transferring energy from the SOL electrons to the ions. The exhaust coils 132 control the expansion rate and shape of the exiting plasma stream 134, important for controlling plasma parameters there. The exiting plasma stream 134 may expand, to reduce the heat load or to allow direct conversion. The energy in the exhausting plasma stream 134 can be converted to electricity by a variety of methods including thermal and direct conversion.

While not shown, additionally included in the fusion reactor 100 are a power supply to provide current to magnets and RF power system for the RMF antennae 124, components to extract heat from the reactor and convert it into electricity, and components to separate H, D, T, $^4$He, and $^3$He in the exhaust plume 114. One method to extract energy from plasma flow is to use an MHD-generator technique, which would entail additional magnets and electrodes in the exhaust stream and/or divertor chamber 134. The exhaust stream plasma 134 is predominantly deuterium, often more than 99.9%. However it will contain important amounts of tritium, hydrogen, helium-3 and helium-4. To separate $^3$He and T, components should be inserted into or attached to the exhaust plume 114 and/or the gas box 118 to perform the important role of separating the stream into its separate constituent isotopes. Methods of isotope separation include superpermeation, gaseous diffusion, and thermal and chemical means.

The main scientific hurdles for small and clean FRC reactors 100 are plasma energy confinement, stability, ion and electron heating, current drive, neutron production, and fuel supply. A technique to address these challenges is disclosed herein, referred to as odd-parity rotating magnetic fields (RMF). This is a single (or possibly chirped or FM) radiofrequency system utilized with the RMF antennae 124 that will heat a plasma's ions and electrons to fusion-relevant energies, efficiently drive large plasma currents, and stabilize the plasma, all while maintaining good energy confinement. Another major advantage of RMF is the FRC size would be small, promoting more rapid and less costly tests and consistent with rapid T removal. Multiple FRC modules may provide higher power levels when needed.

The primary benefits of odd-parity RMF-driven FRC reactors 100 arise from the RMF's unique rotating azimuthal electric field which peaks in the FRC's midplane, the location of a magnetic field null line. Near the null, the rotating electric field will cause unimpeded ion and electron acceleration in opposite azimuthal directions, thus generating the desired current. Phase de-coherence of charged particle trajectories from the periodic RMF occurs when the particles stray from the null line and will, under certain conditions, result in rapid and efficient electron and ion heating. In addition to the stabilization natural to small kinetic (not fluid-like) FRC reactors 100, RMF-generated oscillations of the FRC's boundary separatrix 112 may help stabilize dangerous global, e.g., interchange and co-interchange, instability modes. Low-amplitude RMF does not open FRC field lines and thus promotes good energy confinement. Fusion reactors 100 burning advanced fuels may most readily exceed Rankine-cycle energy conversion efficiency because the fusion products are energetic and electrically charged, allowing for direct conversion. Small FRC reactors 100 would require little energy, roughly that in one gallon of gasoline, to start up.

Exemplary embodiments of the present invention would result in a prototype test reactor, producing 1.8 MW of fusion power and requiring an absorbed RMF power of 0.5 MW. With an energy conversion efficiency of 50%, this D-$^3$He burning FRC would produce 400 kWe net electrical power in 15-minute pulses at a duty factor of 10%. Upgrading to a steady-state full-scale FRC, with 40% higher ion energy, 20% higher density, and a 20% larger radius, would result in 12.1 MW of fusion power and a net electrical power of 4 MW.

To reduce radioactivity to the point where development of radiation-resistant materials is unnecessary and associated siting concerns are minor, the fusion reactors 100 must produce few neutrons. A p-$^{11}$B fuel mixture has a low neutron production rate, about a factor of $10^5$ smaller than D-T. Moreover, $^{11}$B is plentiful, cheap, and safe. However, many scientific studies of this reaction conclude that it will not produce net energy in a fusion reactor because of its low fusion rate, low energy release per reaction, high-required temperature, and relatively low fuel concentration at the expected densities of operation.

The fuel mixture with the next lowest rate of neutron production is D-$^3$He. Neutrons from hot D-$^3$He plasma arise from either D-D or D-T reactions, where the T was produced by half the D-D fusion events. Because of the characteristics of the FRC reactor disclosed herein, its neutron wall load will be at least a factor of 100 lower than that in a conventional D-T fusion reactor. Simply replacing D-T fuel with D-$^3$He fuel in a big fusion reactor, whether a tokamak or an FRC, does not reduce the neutron wall load because T produced by D-D reactions will quickly fuse, producing copious neutrons, unless the T can be rapidly expelled.

Figure 3:
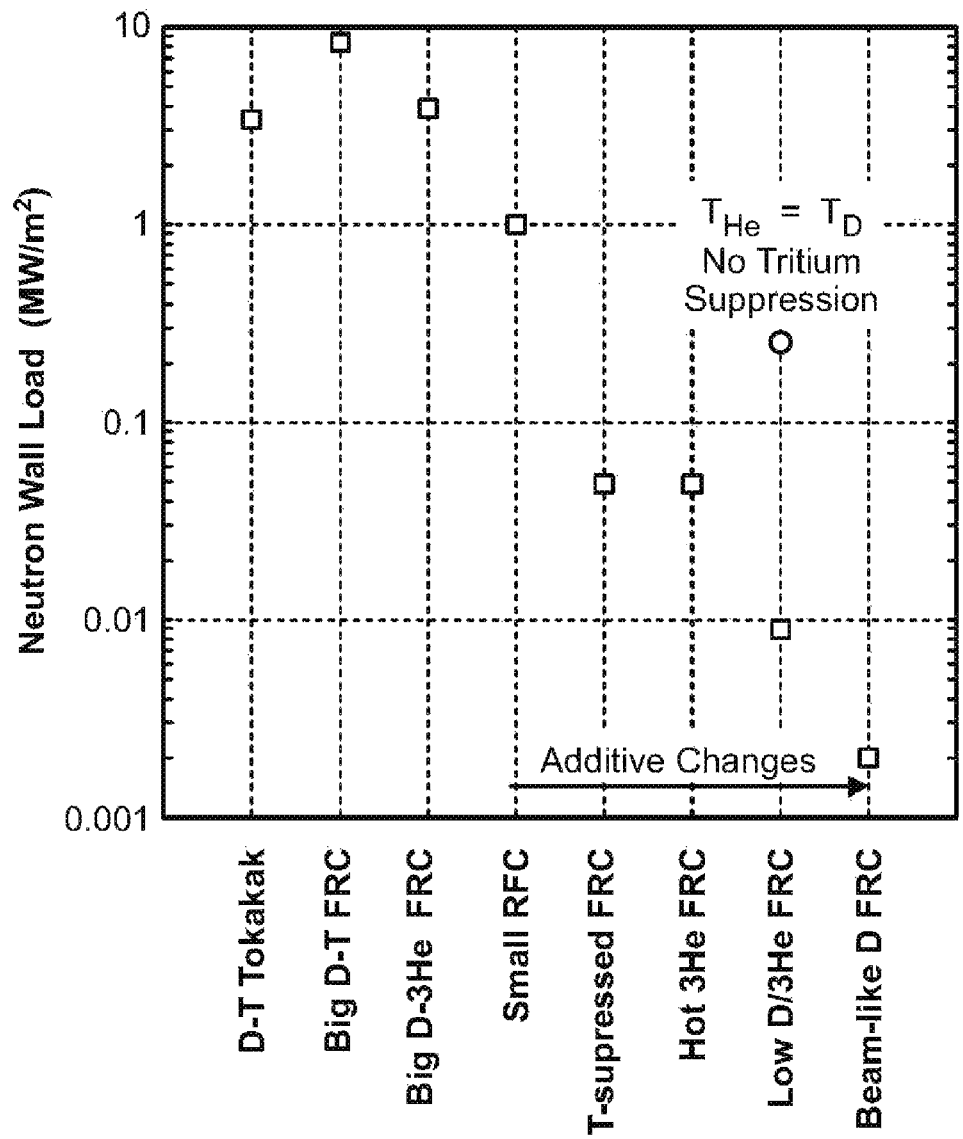
FIG. 3 is a graph showing reduction in neutron power load on internal components of the fusion reactor according to an embodiment of the present invention.

As such, embodiments of the disclosed fusion reactor will be small in order to accelerate T exhaust, hence reduce neutron wall load. The size, the radius in particular, cannot be made too small, below ~15 cm, because the energy confinement would then be insufficient. The size cannot be made too large, larger than ~35 cm, because this interferes with the RMF's ion-heating efficiency, degrades the tritium exhaust technique, and challenges stability criteria. The small size increases the surface-to-volume ratio, roughly linearly with the size reduction. Exemplary embodiments include a reduction factor of at least 4 and as high as 12 in neutron wall load due to the smaller size. The reduction in device size also greatly eases the removal of T. For a 30-cm FRC, over 98% of the T will naturally be lost from the core plasma into the SOL in less than 0.2 s, reducing the neutron production by a factor of 100. Conventional reactors have a T burn-up time of 10 to 30 s. Further, the $^3$He to D ratio may be increased from 1:1 to 3:1. A drop in power by a factor of two would occur, but the neutron fraction of the power drops a factor of 4.4. An additional improvement is to use RMF to generate beam-like D velocity distributions. This causes up to a further factor of 5 lowering of the neutron wall load. The total reduction in neutral wall load based on these improvements may range from a factor of 100 to a factor of 2400. FIG. 3 illustrates such reduction in neutron power load on internal components of the fusion reactor 100 by incorporating the sequence of reactor design improvements described above. Assuming the conservative factor of 100, the required thickness of $B_4C$ shielding only needs to be 40 cm to provide a 30-year lifetime to the components, the most susceptible of which are the superconducting coils, all external to the vacuum vessel and shielding. To contrast, conventional (tokamak) reactor designs call for annual, even biannual, replacements of more-difficult-to-service in-vessel components, because of the intensity of their neutron wall load.

For D-$^3$He fuel mixture, the terrestrially available $^3$He supply is only sufficient to produce about 100 MW for decades. Therefore, embodiments of the present invention may rely on D-D fusion to breed $^3$He since D is abundant and cheap. $^3$He catalyzed D-D fusion is described in V. I. Khvesyuk and A. Yu. Chirkov, Plasma Physics and Controlled Fusion 44, 253 (2002); M. E. Sawan, et al., Fusion Engineering and Design 61-62, 561 (2002); and J. Kesner, et al., Nucl. Fusion 44, 193 (2004), all of which are herein incorporated by reference.

Figure 4:
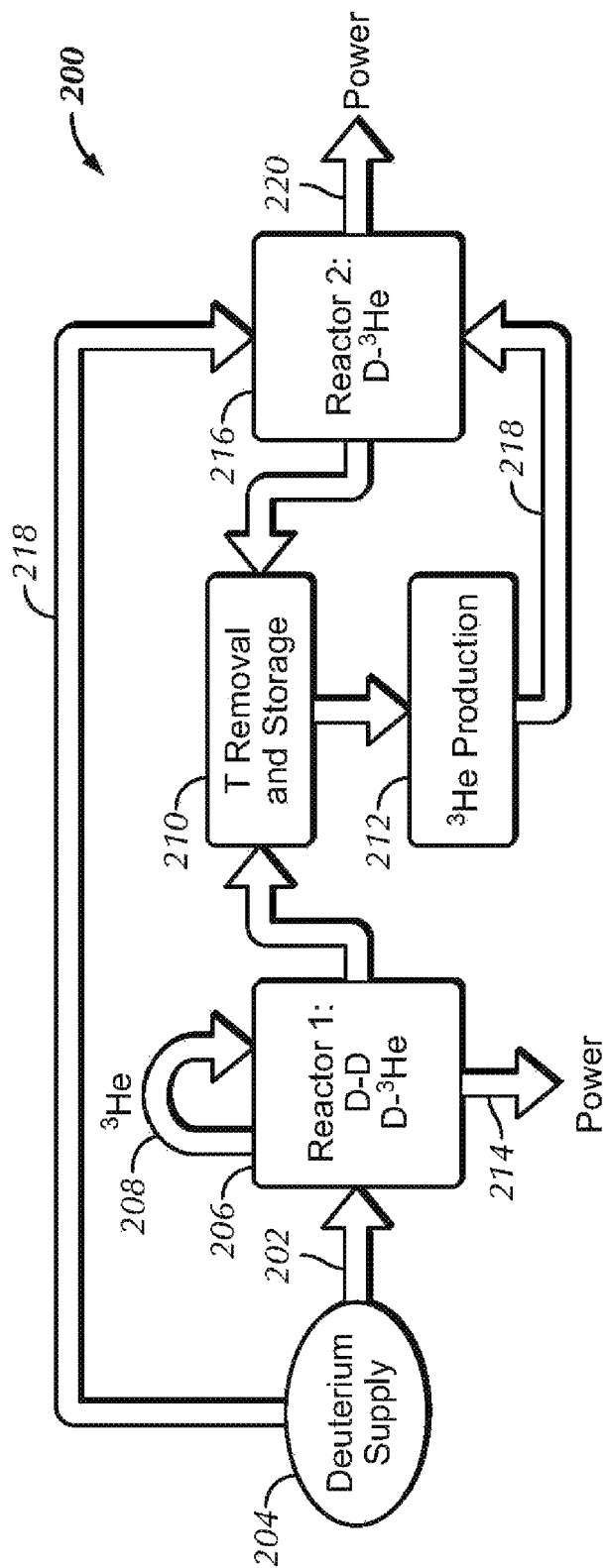
FIG. 4 is a flow chart showing a two-reactor process that allows one reactor to burn D-$^3$He while the other burns D-D and D-$^3$He according to an embodiment of the present invention.

FIG. 4 is a flow chart 200 illustrating a two-reactor process for producing and using $^3$He according to an embodiment of the present invention. The approach disclosed herein is referred to as $^3$He self-sufficient D-$^3$He fusion fuel cycles. In this approach, at initial step 202, a D-D supply 204 is provided to a first reactor 206 to burn the D-D 204 producing ash 102, which includes $^3$He and T. The ash 102 is rapidly exhausted through the exhaust plume 114 and/or the gas box 118 of the first reactor 206 before it can fuse. At step 208, the $^3$He is separated, first through permeable membranes, then by chemical, thermal and/or gaseous centrifuge means (not shown), and then re-injected into the first reactor 206. The exhaust plume plasma would impinge on the wall of a pumped chamber. This wall would be made of a material that was permeable to hydrogen. The hydrogen would pass through the wall to a separate chamber and thus be separated from the helium. Pumps would direct the remaining helium to a gas centrifuge system for separating the $^3$He from the $^4$He. This $^3$He, that produced immediately, is termed type 1. At step 210, the T is removed from the ash 102 and stored for 10-20 years. The T naturally transmutes into $^3$He, shown at step 212. This $^3$He, which is produced by transmutation of T, is termed type 2. The re-injected type-1 $^3$He increases the power output 214 of the first reactor 206 by a factor of 3-4, making the first reactor 206 economical. Type-1 $^3$He and D are burned in a 1:10 ratio in the first reactor 206. $^3$He may be separated from H, T, or D by a process called superpermeation, a description of which can be found in Livshits, A. I. et al., Vacuum 29, (1979) 113, and Park, J. Y. et al., J. Nucl. Matter 220-22, (1995) 827, which are herein incorporated by reference. Neutron (inner) wall load in reactor 1 may be reduced by a factor of 25 compared to that from D-T. By incorporating a 40-cm-thick neutron-absorbing shield, primarily $^{10}$B, around the plasma to absorb D-D's 2.45 MeV neutrons, the superconducting coils can be adequately shielded.

Additionally, to avoid even this reduced level of neutron production, a second reactor 216 suitable for use in populated areas, would burn the type-2 $^3$He (that resulted from the T transmutation) and D in a 3:1 ratio at step 218, as described above. Power output would result from the second reactor 216 at step 220. As such, fusion reactors will be built in pairs, where the first fusion reactor 206 will breed T and $^3$He from D-D fusion. The type-1 $^3$He created immediately by the D-D fusion would be used in the first reactor 206, to increase its power; the T created immediately would be stored for a sufficient time, 10-20 years, to allow it to naturally transmute to type-2 $^3$He and would then be used in the second fusion reactor 216. The second-type fusion reactors 216 may be situated in heavily populated areas, but the first-type fusion reactors 206 should be situated in less densely populated, perhaps remote areas, some distance from population centers. Fusion reactors at those sites might be used for local power generation, for desalinization, for manufacturing, or other uses. Both reactors may be RMF-heated FRC reactors 100 that produce net electrical power.

Embodiments of the present invention further include a method to exhaust charged fusion ash 102, including tritons, protons, $^3$He, and alpha particles, rapidly from the fusion reactors 100. Exhausting fusion ash 102 rapidly from steady-state fusion reactors 100 promotes cleanliness and increases power output. Increasing the rate of exhaust from FRC reactors 100 of energetic T fusion ash 102 will dramatically reduce neutron production, allowing safer operation and less shielding. By reducing the neutron shield thickness, the mass, size, and cost of the reactors 100 decrease.

Moreover, the gas box (also referred herein as a gas-box divertor) 118 reduces peak power flux onto divertor plates by redistributing heat flux over a larger surface area. By utilizing the gas-box divertor 118, the detrimental, localized heat deposition may be largely mitigated by a high pressure (typically 0.03 to 1 T), neutral deuterium gas, which redistributes the plasma energy over a larger surface area as electromagnetic radiation and low-energy neutral particle bombardment.

Due to the small size (~25-cm radius plasma) and relatively low magnetic field (~6 T) of the FRC reactor, the vast majority of the energetic fusion products have orbits that extend up to 8 cm beyond the separatrix 112 into the open field region 108. These fusion products 102 may deposit more than 95% of their energy in the cold plasma 120 that flowed out of the gas box 118 onto the open field region 108, raising the electron temperature of the cool plasma 120 from near 1 eV in the gas box to 10-200 eV in the SOL 110 outside the gas box 118. This method of energy deposition across the SOL's thickness is termed "non-local", in contrast to the diffusive process that is driven by a local thermal gradient, as occurs in conventional tokamak SOLs. The cold plasma 120 was created in the gas box 118 by ionization of the gas feed by power flow into the gas box 118 in the electron conductivity channel. The detailed processes for ionizing the neutral gas in the gas box include photo-ionization and multi-step ionization. A Saha-like equilibrium may exist. The transfer of fast-ion (fusion product) energy to the SOL plasma 120 may be by classical (binary) processes, often called electron drag (described in T. H. Stix, Plasma Physics 14, 367 (1972), herein incorporated by reference), or collective effects, such as 2-stream instabilities (described in N. A. Krall and A. W. Trivelpiece, Principles of Plasma Physics, McGraw-Hill, New York (1973), herein incorporated by reference). This method for broadening the SOL 110—by forming a wide, cold plasma column in and exiting the gas box 118 and extracting energy from large orbit fusion products 102 across the entire SOL thickness as the plasma flows along the separatrix 112, reduces the need for special magnetic coils to spread the magnetic field, some of which are referred to as snowflake divertors proposed for conventional tokamaks.

As fast ions slow down in the SOL 110, the gyro-center of their motion moves radially outward until the entire orbit is in the SOL 110. Once the fusion product energy is below about ¼ MeV, the orbits are fully on open field lines. This process may be accomplished in less than 0.03 seconds. By comparison, T burn-up takes about 30 seconds, so less than 0.1% of the T will fuse. This will allow the 14.1 MeV neutron production to generate less than 0.1% of the fusion power without requiring complex high-power RF equipment as required by alpha channeling.

Figure 5:
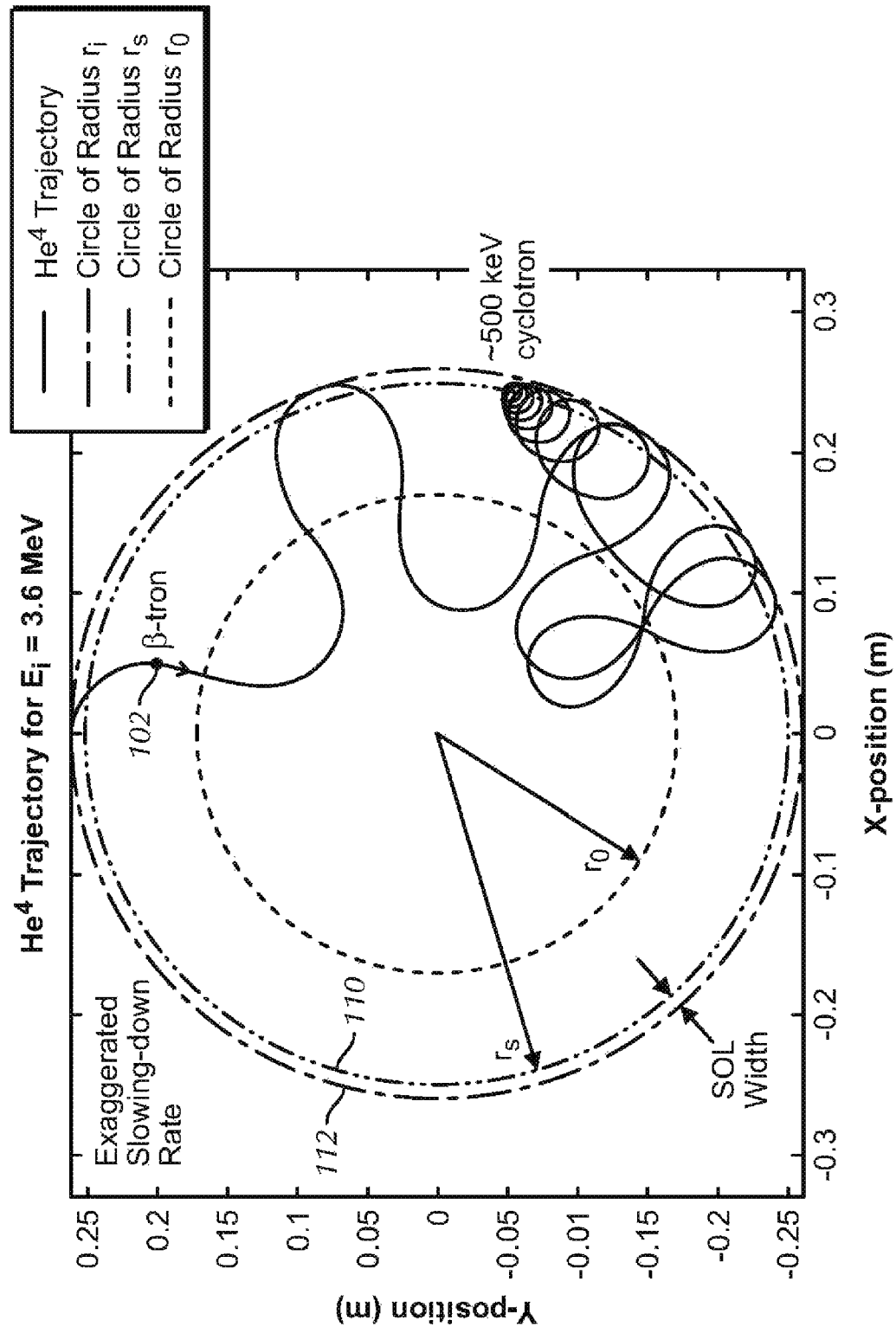
FIG. 5 is a graph showing a midplane cross section of a fusion reactor and the projection of the azimuthal trajectory of an energetic fusion product according to an embodiment of the present invention.

FIG. 5 shows the midplane (z=0) cross section of an embodiment of a 25-cm FRC fusion reactor and the projection of the azimuthal trajectory of an energetic fusion product 102, a 3.6-MeV alpha particle in this example. The separatrix 112 radius, $r_s$, O-point null line radius, $r_o$, and width of the SOL 110 are indicated. The fusion product 102 slows down, predominantly by electron drag in the SOL 110. The rate of slowing down is exaggerated (about 1-million fold) to display the salient features. This energetic alpha particle 102 starts in a betatron orbit. Its motion is snake-like in the clockwise direction. As it slows down the orbit shape changes to a figure-8 shape, at about the 5 o'clock position, and the general motion becomes counterclockwise. Further slowing down changes the orbit to a cyclotron (circular) shape with factor of ~2 reduction the radial extent of the alpha particle's orbit and an outward shift in the gyro-center of the orbit. The orbit's gyro-radius continues to shrink and the gyro-center continues to move radially outward as the alpha particle 102 continues to lose energy to the SOL plasma 110. Throughout this process, the orbit of the alpha particle 102 passes through the SOL 110 near its apogee, that is, every cycle of this nearly periodic orbit. Eventually the alpha particle 102 orbit lies fully in the SOL 110, outside of the separatrix 112, when its energy is typically ¼-½ MeV.

Experiments have shown and theory confirmed that a flowing stream of magnetized plasma carrying 10's of kW/cm$^2$ may be dramatically cooled without touching a material wall by passing it through a length, typically 1 m, of neutral gas of moderate density, near $10^{16}$ cm$^{-3}$. This moderate neutral gas density (or pressure) has been shown to reduce the plasma temperature by more than an order of magnitude. In this process, the plasma density first rises then falls, the latter due to 3-body recombination, often by more than an order of magnitude.

A scrape-off layer (SOL) of plasma was simulated using UEDGE multi-fluid code, adapted for one dimension. In order to be consistent with a one-dimensional simulation, the cylindrical geometry of the fusion reactor was modified to that of a slab geometry, with a computational mesh of the SOL in a y-z plane. For reference, the major axis of the fusion reactor was along the z-axis. To that end, there was no variation considered in the x or y directions of the fusion reactor. In order to normalize the one-dimensional case, the code assumed that the slab is 1-m thick in the x-direction, corresponding to an FRC with 16-cm-radius plasma core.

Despite the nominal one-dimensional aspect of the simulation, in the y-z plane there are three radial cells in the y-direction, and a variable number of cells in the z-direction. The setup disclosed herein corresponded to a main row of central cells, bounded on all sides by a perimeter of guard cells. The purpose of the guard cells is numerical, used to set radial flux boundary conditions and simulate injection of power and/or particles into the system. The number of cells in the z-direction was variable to provide a means by which the resolution of the simulation may be controlled. For these observations, 128 cells were simulated along the z-axis.

The main row (in the z-direction) extended from two main axial boundaries of the fusion reactor, simulating a closed end (gas box divertor) on the right and open end (exhaust stream) on the left of the fusion reactor through which high-speed exhaust passes. This configuration may be suitable for a propulsive application, such as a rocket engine.

A plasma column with a radius (thickness) of about 0.01 m was simulated in the presence of a constant axial 0.5 T magnetic field. The plasma in the fusion reactor was 2 m long.

Energy was volumetrically added to the system, via heated electrons. Ions were not heated for volumetric power addition, as this electron-specific type of heating is primarily expected from slowing-down fusion products. This power injection was not uniform along the axis, in order to match the realistic condition that power may only be input through a boundary corresponding to the axial length of the separatrix. The power input into the cells varied as a Gaussian along the z-axis, with the Gaussian peak at z=0 and the Gaussian's axial length approximating the separatrix length of the core of the fusion reactor. The half-width of the Gaussian was set at 0.125 m. This power input was tuned, generally on the scale of 1 to 15 MW.

Neutral gas injection into the gas box was also simulated, with values ranging from approximately 1 to 50 kilo-equivalent-amps (the neutral analog of electric current, amps, with 1 molecule of neutral deuterium being $3.2 \times 10^{19}$ Coulombs of equivalent charge). These values were tuned in order to see varying plasma behavior near the boundary.

Simulations were run with variable power inputs and neutral gas flow rates (into the gas box) in order to look for cases with plasma detachment, a condition in which less plasma damage to the gas box (or divertor chamber) walls is expected because most charged particle energy is converted to photons and low energy neutrals. These simulations also were required for providing the SOL electron density and temperature for calculating the fast-ion slowing down rate. The photons and low energy neutrals spread out over most of the gas-box walls in contrast to a plasma stream which concentrates its power to where the SOL field lines hit the gas box wall. A precipitous drop in electron temperature, typically to below 2 eV, accompanies plasma detachment. For these simulations, plasma was considered detached if the minimum plasma temperature was less than 5% of the plasma's electron temperature at the midplane. Plasma density was also recorded in order to better examine the detachment which first shows a plasma density increase (axially in the gas box) then a decrease, and possibly a second rise due to "reheat." Additionally, the neutral gas density and pressure were recorded in order to determine correlations between neutral gas density and/or pressure and plasma detachment.

Trends were compared for the ratio of the power input to the corresponding gas injection rate required to lower the plasma temperature, in order to determine their relationship. This allowed for the comparison of data obtained at different power levels or gas flow rates. Furthermore, the aforementioned variables (electron temperature, neutral gas density, etc.) were subdivided into group according to the power input to see if different proportions of gas flow rate/power input were required at different power inputs, for the same temperature drop.

Figure 6A:
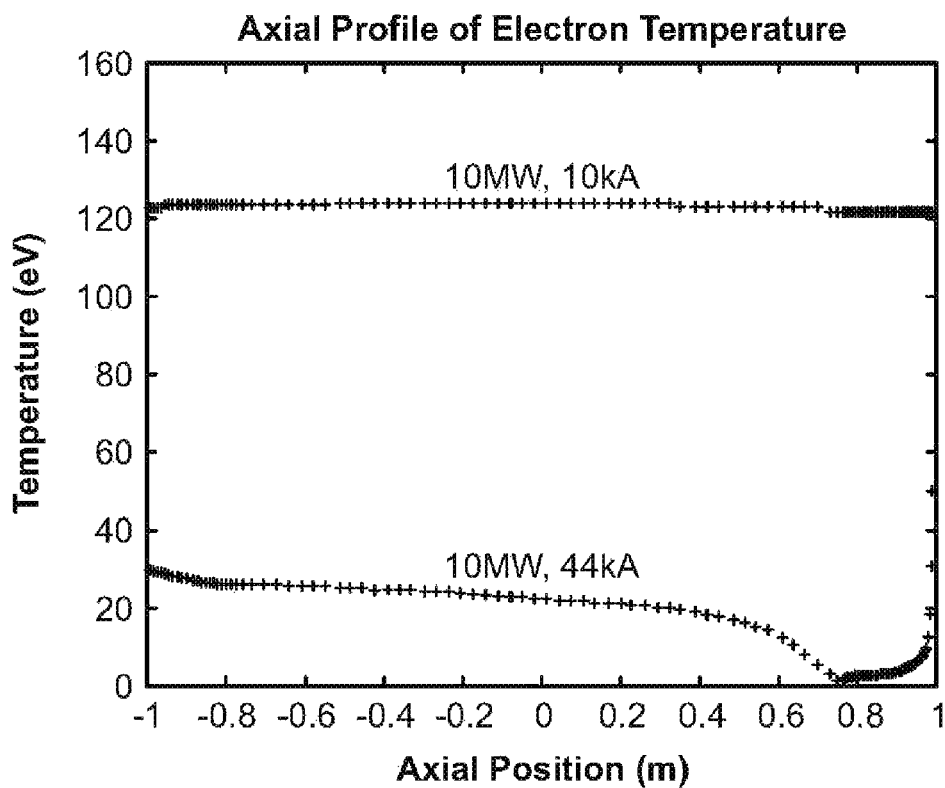
FIGS. 6a and 6b are two graphs showing the predicted axial profiles of electron temperature and ion temperature in a scrape-off layer (SOL) according to an embodiment of the present invention.
Figure 6B:
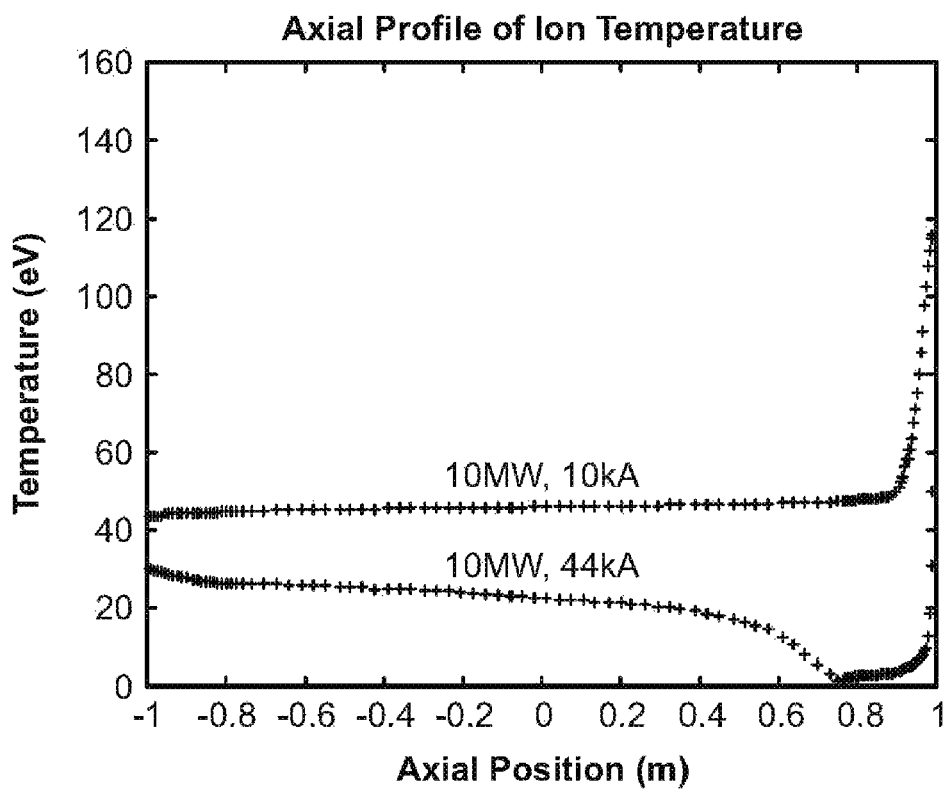
Figure 7A:
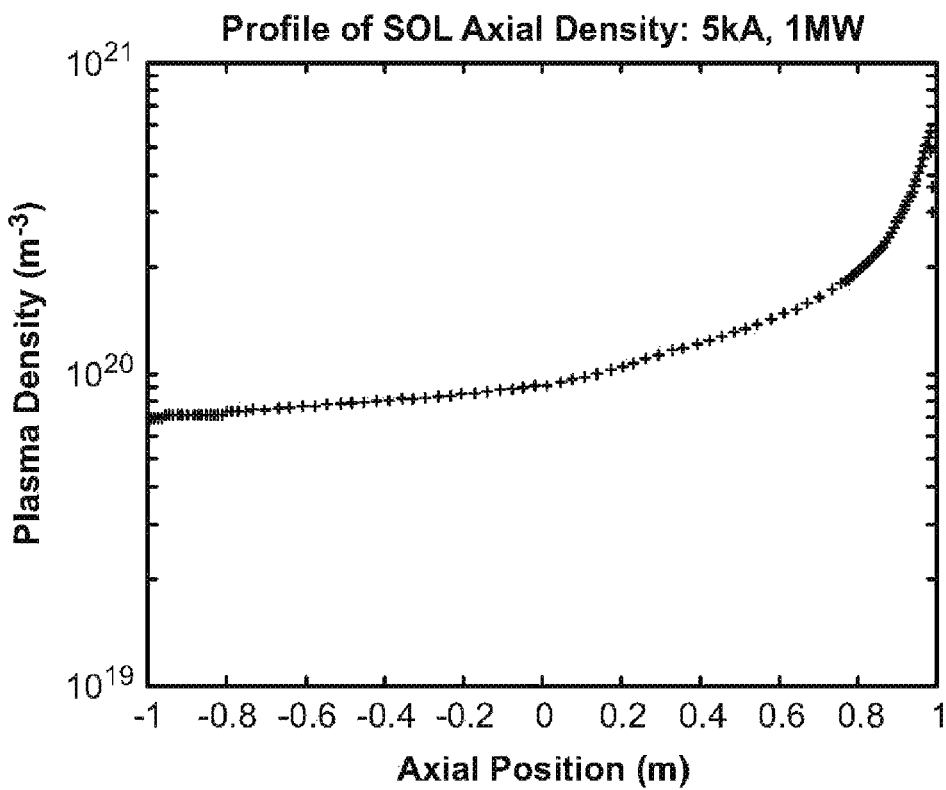
FIG. 7a-7d are four graphs showing axial values of plasma electron density in the SOL versus various fusion power inputs into the SOL and neutral gas feed rates into the gas box according to an embodiment of the present invention.
Figure 7B:
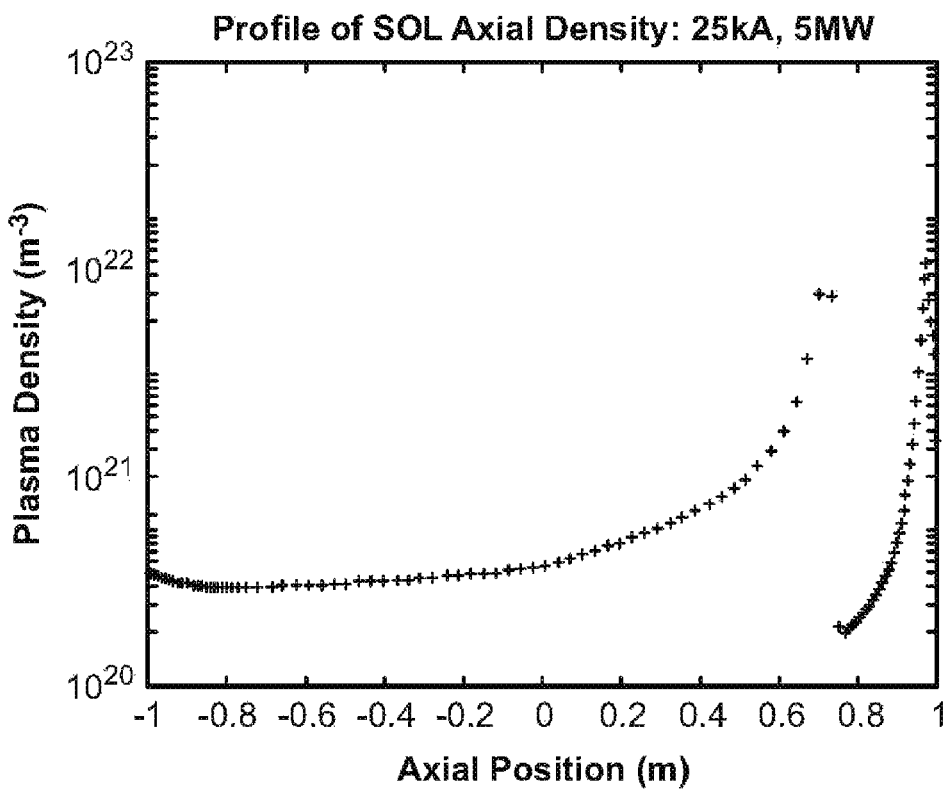
Figure 7C:
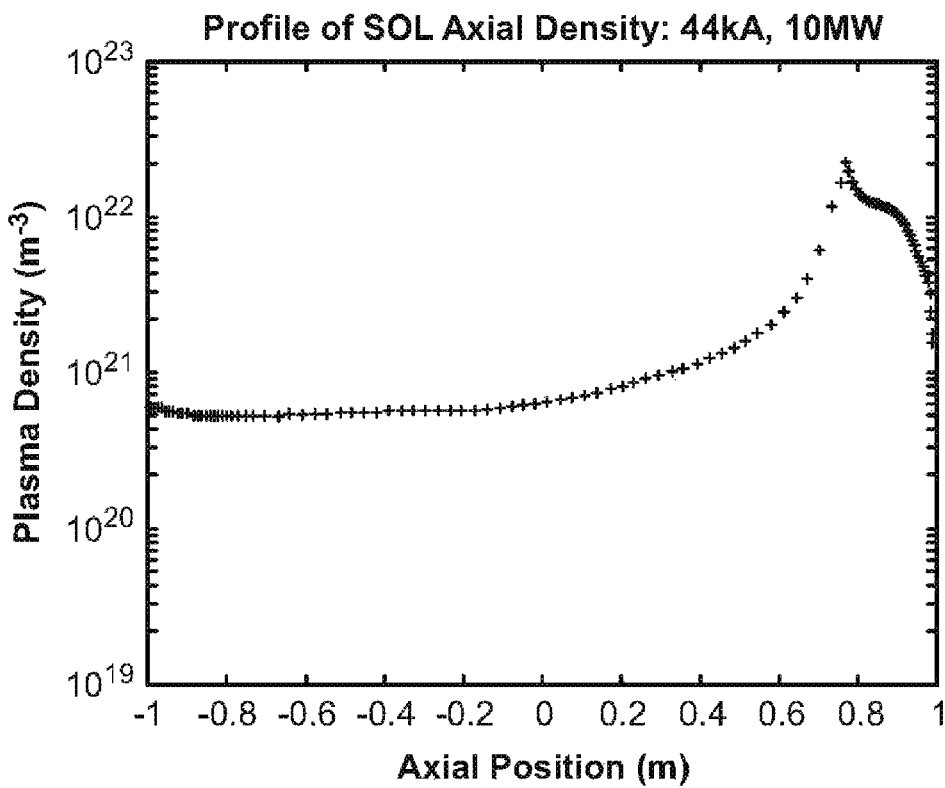
Figure 7D:
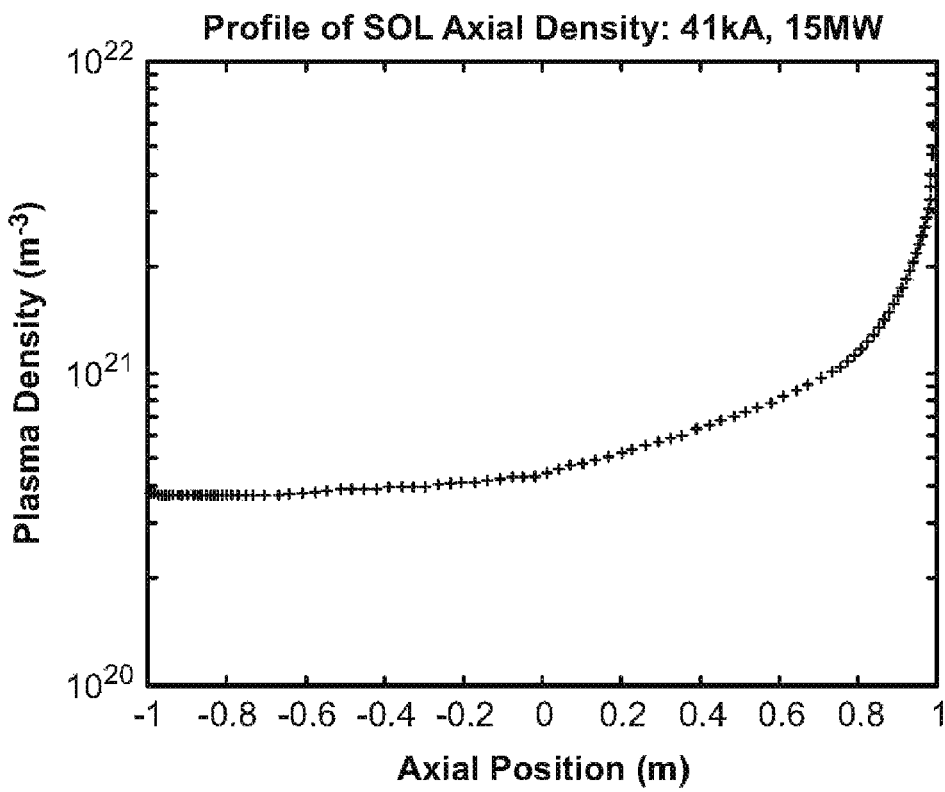
Figure 8:
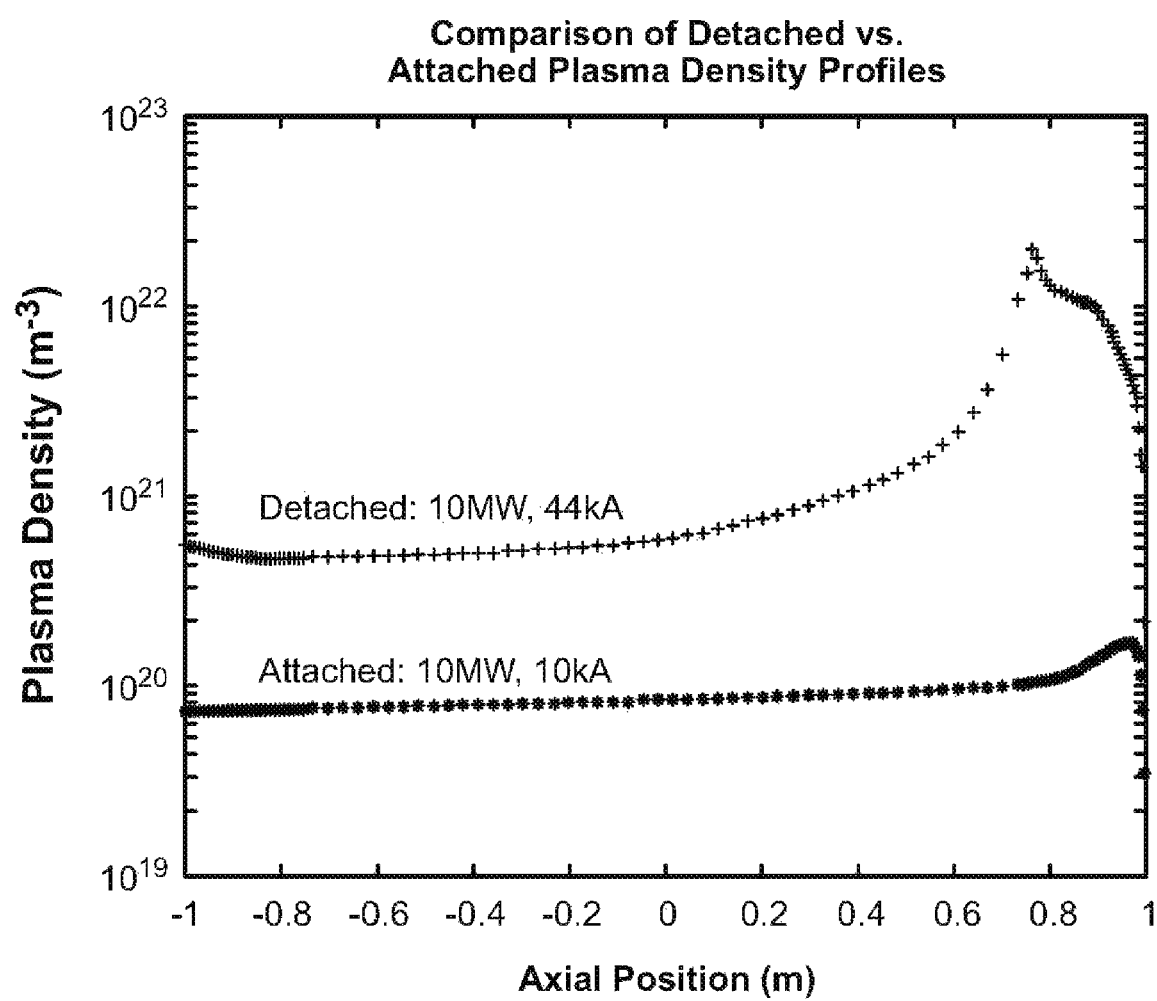
FIG. 8 is a graph showing axial profiles of plasma electron density in the SOL for two modes of divertor operation, attached and detached, according to an embodiment of the present invention.
Figure 9:
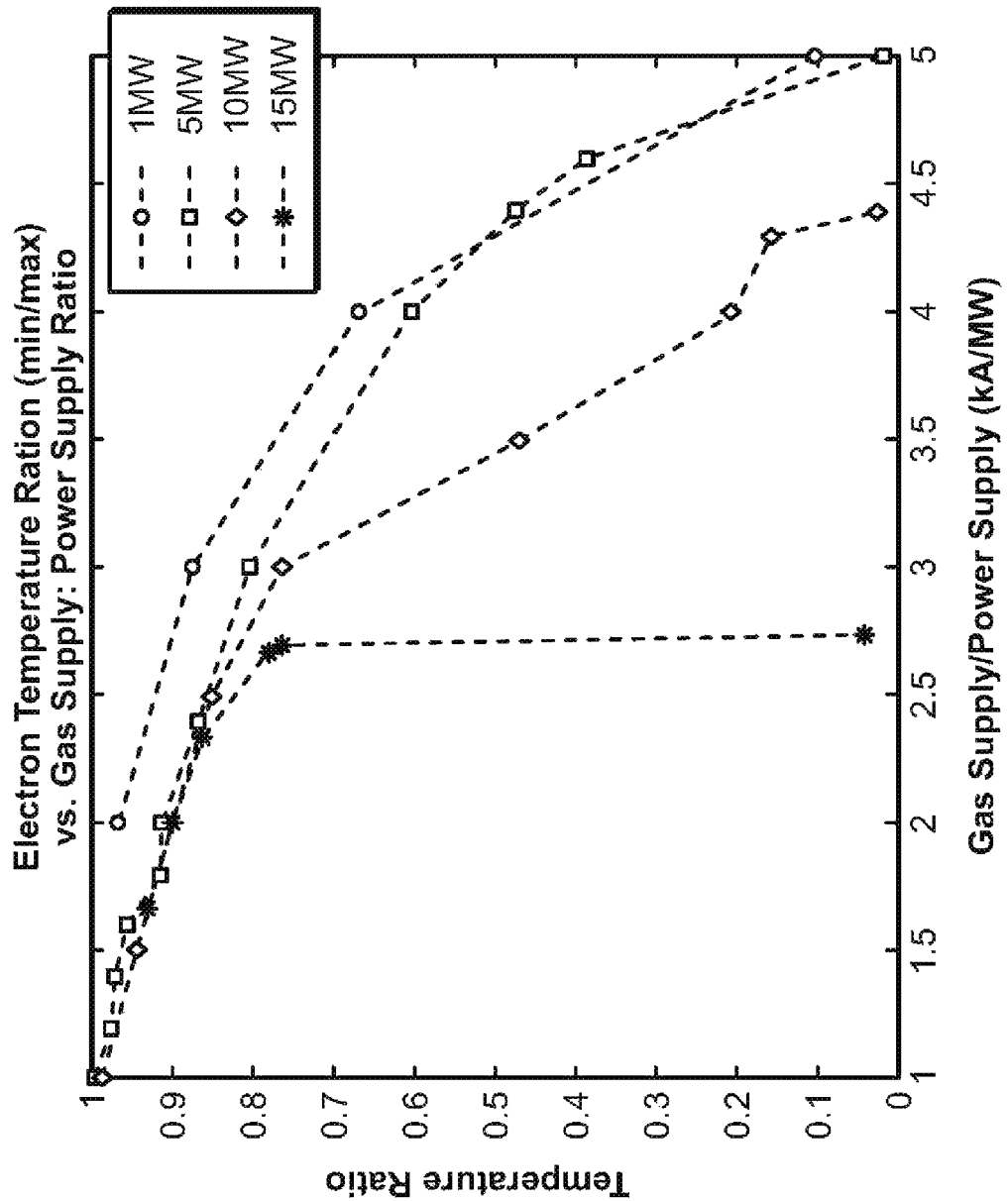
FIG. 9 is a graph showing the ratio of midplane to minimum gas-box electron temperature as a function of gas flow/power input according to an embodiment of the present invention.
Figure 10:
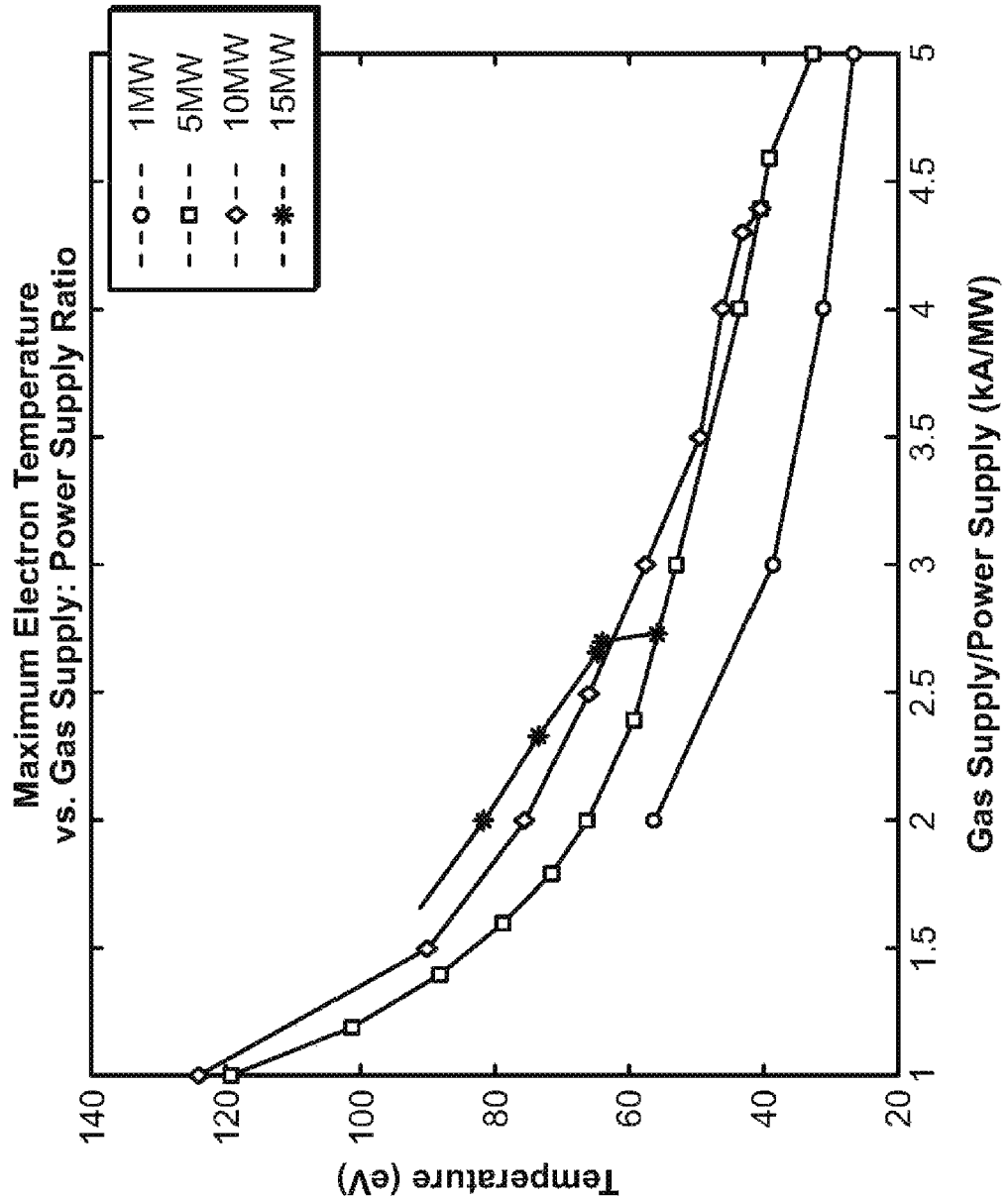
FIG. 10 is a graph showing maximum (midplane) SOL electron temperatures attained as function of gas supply/power supply, for four powers, according to an embodiment of the present invention.

The results are shown in FIGS. 6-10. FIG. 6 illustrates the axial profiles of electron temperature and ion temperature, comparing a detached (44 kA) to an attached (10 kA) scenario at the same input power level, 10 MW. The gas box is on the right, z=0.75-1 m. FIG. 7 illustrates four plasma-density cases for 4 different power and neutral gas inputs, illustrating axial profiles of plasma density from four different power/gas input values. In all these cases the midplane (z=0) plasma density exceeds $10^{14}$ cm$^{-3}$, showing that our assumption of a plasma density of $5 \times 10^{13}$ cm$^{-3}$ for the fast-ion slowing-down evaluations was conservative. FIG. 8 illustrates the axial variation of the plasma density for a 10 MW reactor and two different rates of gas flow into the gas box, the same powers and gas flows as for FIG. 6. The plasma with 10 kA equivalent gas in-flow is attached; the plasma with 44 kA equivalent gas in-flow is detached. FIG. 9 shows the ratio of gas box to central electron temperature as a function of gas flow/power input. FIG. 10 shows the maximum SOL electron temperatures attained as function of gas supply/power supply.

As seen in the above simulations, it is proportionally easier, as inferred from the gas supply/power supply ratio (GS/PS) ratio, to detach the plasma as more power is input to the system. As shown in FIG. 9, when the power supply is 1 MW, potential plasma detachment may be seen at GS/PS=5 kA/MW, leading to a temperature ratio of 0.10. However, as power input is increased, as is the case at 15 MW, only 41 kA equivalent-amps are required, corresponding to GS/PS=2.73 kA/MW for a temperature ratio of 0.04. Accordingly, high neutral gas densities are achieved for lower GS/PS values, as power supply is increased. This directly links neutral gas density and plasma detachment.

The maximum SOL plasma electron temperatures shown in FIG. 10 versus gas supply/power supply. This variable, SOL electron temperature, is highly relevant for fast ion slowing down. Notably, higher plasma temperatures were observed at lower GS/PS values; as more gas was injected into the system, the plasma grew cooler, eventually leading to potential detachment. However, for higher power levels, the maximum SOL plasma temperature was also higher, across all GS/PS ratios. For example, At GS/PS=2 kA/MW, the maximum SOL plasma temperature is 81.5 eV for 15 MW power addition, but only 55.7 eV for 1 MW power addition. Unlike the plasma core, where a high temperature is always desired, the temperatures preferable for the SOL depends on its function—whether to slow down fast ions or to generate a high specific impulse for propulsion. These gas box simulations show we have flexibility to control the SOL temperature throughout a highly desirable range and satisfy both functions simultaneously.

Higher rates of gas injection, at fixed power input, correspond to an overall drop in the maximum SOL plasma temperature and an increase in SOL density, both increasing the fast ion slowing down rate. Detachment behavior was further associated with higher rates of gas injection. Specifically, plasma temperature would sharply drop near the divertor target, resulting is less sputter erosion. At higher power levels, the overall maximum plasma temperature of the SOL was increased. However, for higher power levels, lower gas injection rates relative to the power were required to observe detachment-like behavior. Thus, at higher power levels, it may be proportionally easier to detach hot plasma in the gas box of the FRC.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for increasing $^3$He supply for use in field reversed configuration (FRC) fusion reactors, comprising:
    burning deuterium (D) with D in a first FRC reactor to breed first helium-3 ($^3$He) and tritium (T);
    separating the first $^3$He from the T through a permeable membrane in the first FRC reactor;
    producing power in the first FRC reactor by burning the first $^3$He with the D in the first FRC reactor;
    storing the T for a predetermined period of time such that the T transmutes to second $^3$He; and
    producing power in a second FRC reactor by burning the second $^3$He with D in the second FRC reactor.

2. The method of claim 1, wherein breeding first $^3$He and T comprises exhausting ash that includes the first $^3$He and T through an exhaust plume in the first FRC reactor.

3. The method of claim 2, wherein the ash is exhausted before it can fuse.

4. The method of claim 1, wherein breeding first $^3$He and T comprises exhausting ash that includes the first $^3$He and T through a gas box in the first FRC reactor.

5. The method of claim 1, wherein separating the first $^3$He from the T comprises separating via superpermeation.

6. The method of claim 1, wherein separating the first $^3$He from the T comprises separating via at least one of a thermal, chemical, and centrifugal process.

7. The method of claim 1, further comprising separating the first $^3$He from $^4$He via a gas centrifuge system in the first FRC reactor.

8. The method of claim 1, wherein the first $^3$He and the D-D are burned at a ratio of 1:10 in the first FRC reactor.

9. The method of claim 1, wherein the predetermined period of time comprises 10 to 20 years.

10. The method of claim 1, wherein producing power in a second FRC reactor further comprises burning D.

11. The method of claim 10, wherein the second $^3$He and D are burned at a ratio of 3:1 in the second FRC reactor.

* * * * *